(12) United States Patent
Chifor et al.

(10) Patent No.: US 11,750,714 B2
(45) Date of Patent: Sep. 5, 2023

(54) FAST RESUMPTION OF DORMANT SESSIONS ON A CLIENT DEVICE

(71) Applicant: LENOVO ENTERPRISE SOLUTIONS (SINGAPORE) PTE. LTD., Singapore (SG)

(72) Inventors: Bogdan-Cosmin Chifor, Bucharest (RO); George-Andrei Stanescu, Ploiesti (RO); Radu Mihai Iorga, Bucharest (RO); Corneliu-Ilie Calciu, Bucharest (RO)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 15 days.

(21) Appl. No.: 16/836,722

(22) Filed: Mar. 31, 2020

(65) Prior Publication Data
US 2021/0306434 A1 Sep. 30, 2021

(51) Int. Cl.
*H04L 67/55* (2022.01)
*H04L 69/16* (2022.01)
*H04L 67/02* (2022.01)
*H04W 80/06* (2009.01)
*H04W 4/10* (2009.01)
*H04W 68/02* (2009.01)
*H04L 67/14* (2022.01)

(52) U.S. Cl.
CPC .............. *H04L 67/55* (2022.05); *H04L 67/02* (2013.01); *H04L 67/14* (2013.01); *H04L 69/16* (2013.01); *H04W 4/10* (2013.01); *H04W 68/02* (2013.01); *H04W 80/06* (2013.01)

(58) Field of Classification Search
CPC ......... H04L 67/26; H04L 67/02; H04L 67/14; H04L 69/16; H04L 67/55; H04W 4/10; H04W 68/02; H04W 80/06
See application file for complete search history.

(56) References Cited

U.S. PATENT DOCUMENTS

| 10,243,877 | B1* | 3/2019 | Govindarajan | H04L 47/2441 |
| 2008/0307093 | A1* | 12/2008 | Song | H04L 67/14 709/226 |
| 2009/0172184 | A1* | 7/2009 | Wason | H04L 69/16 709/237 |

(Continued)

OTHER PUBLICATIONS

Holmberg et al., "Push Notification with the Session Initiation Protocol (SIP)", Oct. 30, 2017, 8 pages.
Wikipedia, "Wake-on-LAN", Retrieved Dec. 2, 2019, 10 pages.

*Primary Examiner* — Jonathan A Bui
*Assistant Examiner* — Zonghua Du (57) ABSTRACT

Methods, apparatuses, and computer program products for fast resumption of dormant sessions on a client device are disclosed. A client device receives a push notification from a push notification server, the push notification having a payload that includes a datagram packet from an application server that initiated the push notification. A push notification process on the client device extracts the datagram packet from the push notification and injects the datagram packet into a communications protocol stack for at least one application on the client device. The application is awakened from a dormant state and reads the datagram packet. The application may then send a response to the datagram packet to the application server.

17 Claims, 9 Drawing Sheets

(56) References Cited

U.S. PATENT DOCUMENTS

| | | | | |
|---|---|---|---|---|
| 2012/0291042 | A1* | 11/2012 | Stubbs | G06F 9/5094 |
| | | | | 718/104 |
| 2013/0190032 | A1* | 7/2013 | Li | H04L 67/56 |
| | | | | 455/517 |
| 2013/0201825 | A1* | 8/2013 | Masputra | H04L 47/6215 |
| | | | | 370/252 |
| 2013/0204965 | A1* | 8/2013 | Masputra | H04L 47/60 |
| | | | | 709/217 |
| 2013/0275530 | A1* | 10/2013 | Matson | H04L 51/24 |
| | | | | 709/206 |
| 2013/0308690 | A1* | 11/2013 | Kalla | H04W 52/0216 |
| | | | | 375/222 |
| 2015/0351074 | A1* | 12/2015 | Vyas | H04W 68/005 |
| | | | | 455/414.2 |
| 2017/0171087 | A1* | 6/2017 | Kumar | H04L 47/11 |
| 2018/0063784 | A1* | 3/2018 | Abraham | A61N 1/37252 |
| 2018/0227332 | A1* | 8/2018 | Neystadt | H04L 65/1093 |

* cited by examiner

FAST RESUMPTION OF DORMANT SESSIONS ON A CLIENT DEVICE

BACKGROUND

Field of the Invention

The field of the invention is data processing, or, more specifically, methods, apparatus, and products for fast resumption of dormant sessions on a client device.

Description of Related Art

Battery powered resource-constrained devices, like smartphones and Internet-of-Things (IoT) devices use cloud-enabled applications. These applications are event-driven where the communication with the cloud service is asynchronous. In such a scenario, the operating systems of these devices optimize the power consumption by transitioning the applications into a sleep state and interrupting the communication. The application can be transitioned out of the sleep state by a push notification message that triggers a connection resume procedure. The connection resume procedure requires that one or more packets be transmitted from the device application to the cloud application to establish the communication channel before receiving any packets from the cloud application, particularly where network address translation (NAT) is implemented for transmitting packets to the device.

SUMMARY

An embodiment in accordance with the present invention is directed to a method for fast resumption of dormant sessions on a client device that includes receiving, by a client device, a push notification from a push notification server, extracting, by a notification process on the client device, a datagram packet from the push notification, injecting, by the notification process, the datagram packet into a communication stack for at least one application on the client device, and reading, by the at least one application, the datagram packet. In some embodiments, the method may further comprise responding, by the at least one application, to a sender of the datagram packet. Responding, by the at least one application, to a sender of the datagram packet may include sending a response packet to an application server that transmitted the datagram packet as a payload of a notification request to the push notification server. The push notification includes the payload from the notification request transmitted to the push notification server. Receiving, by a client device, a push notification from the push notification server may include receiving the push notification in at least one of a transport control protocol (TCP) packet and a transport layer security (TLS) packet.

Another embodiment in accordance with the present invention is directed to an apparatus for fast resumption of dormant sessions on a client device, the apparatus comprising a computer processor, a computer memory operatively coupled to the computer processor, the computer memory having disposed within it computer program instructions that, when executed by the computer processor, cause the apparatus to carry out the steps of receiving, by a client device, a push notification from a push notification server, extracting, by a notification process on the client device, a datagram packet from the push notification, injecting, by the notification process, the datagram packet into a communication stack for at least one application on the client device, and reading, by the at least one application, the datagram packet. In some embodiments, the steps may further comprise responding, by the at least one application, to a sender of the datagram packet. Responding, by the at least one application, to a sender of the datagram packet may include sending a response packet to an application server that transmitted the datagram packet as a payload of a notification request to the push notification server. The push notification includes the payload from the notification request transmitted to the push notification server. Receiving, by a client device, a push notification from the push notification server may include receiving the push notification in at least one of a transport control protocol (TCP) packet and a transport layer security (TLS) packet.

Yet another embodiment in accordance with the present invention is directed to a computer program product for fast resumption of dormant sessions on a client device, the computer program product disposed upon a computer readable medium, the computer program product comprising computer program instructions that, when executed, cause a computer to carry out the steps of receiving, by a client device, a push notification from a push notification server, extracting, by a notification process on the client device, a datagram packet from the push notification, injecting, by the notification process, the datagram packet into a communication stack for at least one application on the client device, and reading, by the at least one application, the datagram packet. In some embodiments, the steps may further comprise responding, by the at least one application, to a sender of the datagram packet. Responding, by the at least one application, to a sender of the datagram packet may include sending a response packet to an application server that transmitted the datagram packet as a payload of a notification request to the push notification server. The push notification includes the payload from the notification request transmitted to the push notification server. Receiving, by a client device, a push notification from the push notification server may include receiving the push notification in at least one of a transport control protocol (TCP) packet and a transport layer security (TLS) packet.

In various embodiments, injecting, by the notification process, the datagram packet into the communication stack for at least one application on the client device may include scheduling the at least one application to read the datagram packet. In various embodiments, the client device is a resource-constrained device and the at least one application is time-sensitive application. In various embodiments, the datagram packet and the response packet may be transmitted using a connectionless protocol such a User Datagram Protocol (UDP).

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
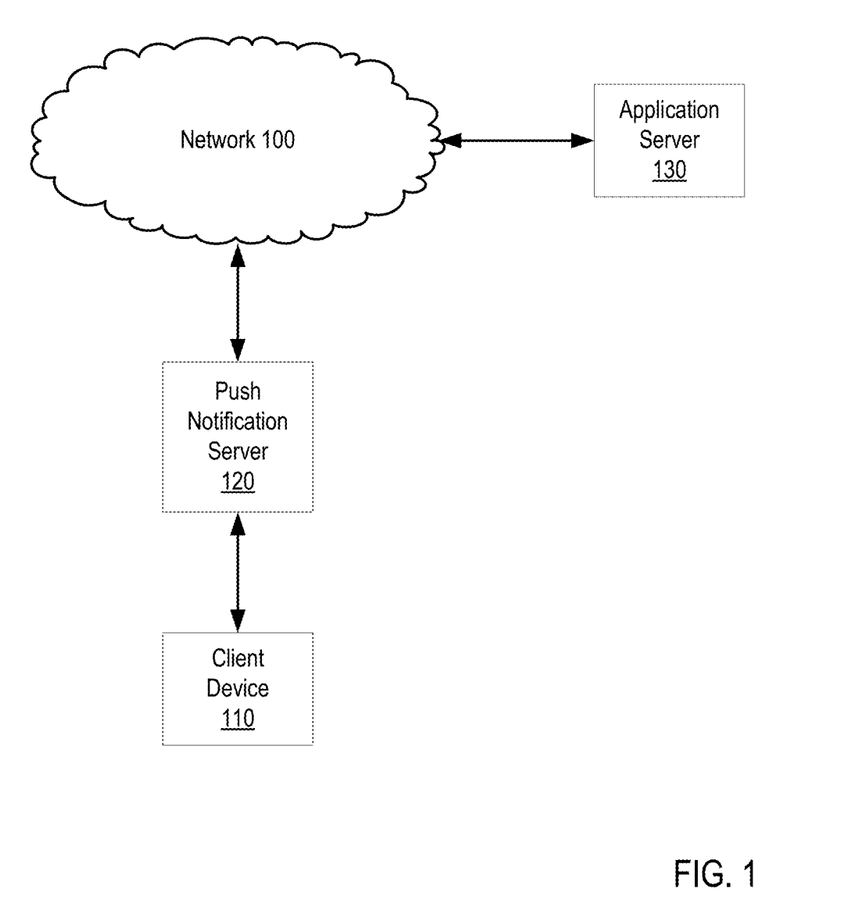
FIG. 1 is an exemplary network diagram of a system configurable according to embodiments of the present invention.

Exemplary methods, apparatus, and products for fast resumption of dormant sessions on a client device in accordance with the present invention are described with reference to the accompanying drawings, beginning with FIG. 1. FIG. 1 sets forth a network diagram of a system configured for fast resumption of dormant sessions on a client device according to embodiments of the present invention. The system of FIG. 1 includes a client device (110) hosting one or more applications, a notification platform server (120) that communicates push notifications to the client device (110), and an application server (130) that provides a cloud-enabled service to the application (315). The client device (110) may be a resource-constrained device (e.g., a portable device, smartphone, or Internet-of-Things (IoT) device) in that applications and processes on the device (110) may be placed in a dormant state to conserve battery charge, processor and memory resources, communication bandwidth, and so on. These applications are typically event-driven and communicate with the application server (130) asynchronously. The operating system of the client device (110) optimizes, for example, power consumption by transitioning the application into a sleep state and interrupting the communication between the application hosted on the client device (110) and the application server (130).

Applications hosted on the client device (110) can be awakened, or transitions from the dormant state, by a push notification message that triggers a procedure for the application to resume the connection with the application server (130). In such scenarios, the application server (130) sends a push notification request to a notification platform server (120) of the client device (110) to request that the notification platform server (120) send a push notification to the client device (110) so that the application will transition to a wake state and reestablish a communication link with the application server (130). For example, the notification platform server (120) may be part of a communications cloud that provides network access to the client device (110), such as a cellular network provider or a wireless access provider. The push notification transmitted to the client device (110) is an asynchronous message sent from a cloud platform notification server (120) to the client device (110). The push notification paradigm uses a single process on the client device (110) that manages a continuous network connection with the notification server (120), using a connection-oriented reliable transmission protocol like TCP (Transmission Control Protocol), TLS (Transport Layer security) protocol, and the like. When this process receives a push notification message, it distributes it to other application processes on the client device (110). The push notification will trigger removal of the application from the dormant state, and the application resumes the network session with the application server (130) by sending additional packets.

Applications on resource-constrained devices such as smartphones and IoT devices typically use datagram-based connectionless protocols like UDP (User Datagram Protocol) in order to transport an application protocol. When the application server (130) transmits a datagram packet to a dormant application hosted on the resource constrained device, the normal transmission channel (e.g., a UDP socket) will time-out because the client application will not respond, the connection being blocked by the client device (110) operating system. In this scenario, the cloud platform notification server (120) transmits a push notification to the client device (110), which will determine the client application to reinitiate the communication channel. In this scenario, at least one packet has to be sent by the client device (110) in order to receive the data from the application server (130), taking into consideration a Network Address Translator (NAT) environment.

However, because additional packets need to be sent from the client device (110) to the application server (130) to resume the dormant session, this push notification mechanism increases communication latency and causes additional operations to be executed. These issues can be unacceptable for critical time-sensitive applications hosted on the client device (110) that must be awakened in order to receive data in a timely manner. For example, the application server (130) may be a time-sensitive application server in that it provides time-sensitive service to applications hosted on the client device (110). Examples of time-sensitive applications hosted on the client device (110) and served by the application server (130) may include messaging/chat applications, stock trading applications, and other such application that will occur to those of skill in the art where it is desirable, necessary, or advantageous that the application be timely apprised of data from the application server (130).

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), TLS (Transport Layer security) protocol, UDP (User Datagram Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Fast resumption of dormant sessions on a client device in accordance with the present invention is generally implemented with computers, that is, with automated computing machinery. In the system of FIG. 1, for example, all the client device (110), push notification server (120), and the application server (130) are implemented to some extent at least as computers. For further explanation, therefore, FIG. 2 sets forth a block diagram of automated computing machinery comprising an exemplary computer (152) configured for fast resumption of dormant sessions on a client device according to embodiments of the present invention. The computer (152) of FIG. 2 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is a push notification process (313), a module of computer program instructions improved for fast resumption of dormant sessions on a client device according to embodiments of the present invention. Also stored RAM (168) is communication protocol stack (317), a module of computer program instructions for implementing a suite of network protocols. Also stored in RAM (168) is at least one application (315), a module of computer program instructions for user functions. Also stored in RAM (168) is an operating system (154). Operating systems useful in computers configured for fast resumption of dormant sessions on a client device according to embodiments of the present invention include UNIX', Linux™, Microsoft XP™, AIX™, IBM's i5/OS™, and others as will occur to those of skill in the art. The operating system (154), push notification process (313), application (315), and communications stack (317) in the example of FIG. 2 are shown in RAM (168), but many components of such software typically are stored in non-volatile memory also, such as, for example, on a disk drive (170).

Figure 2:
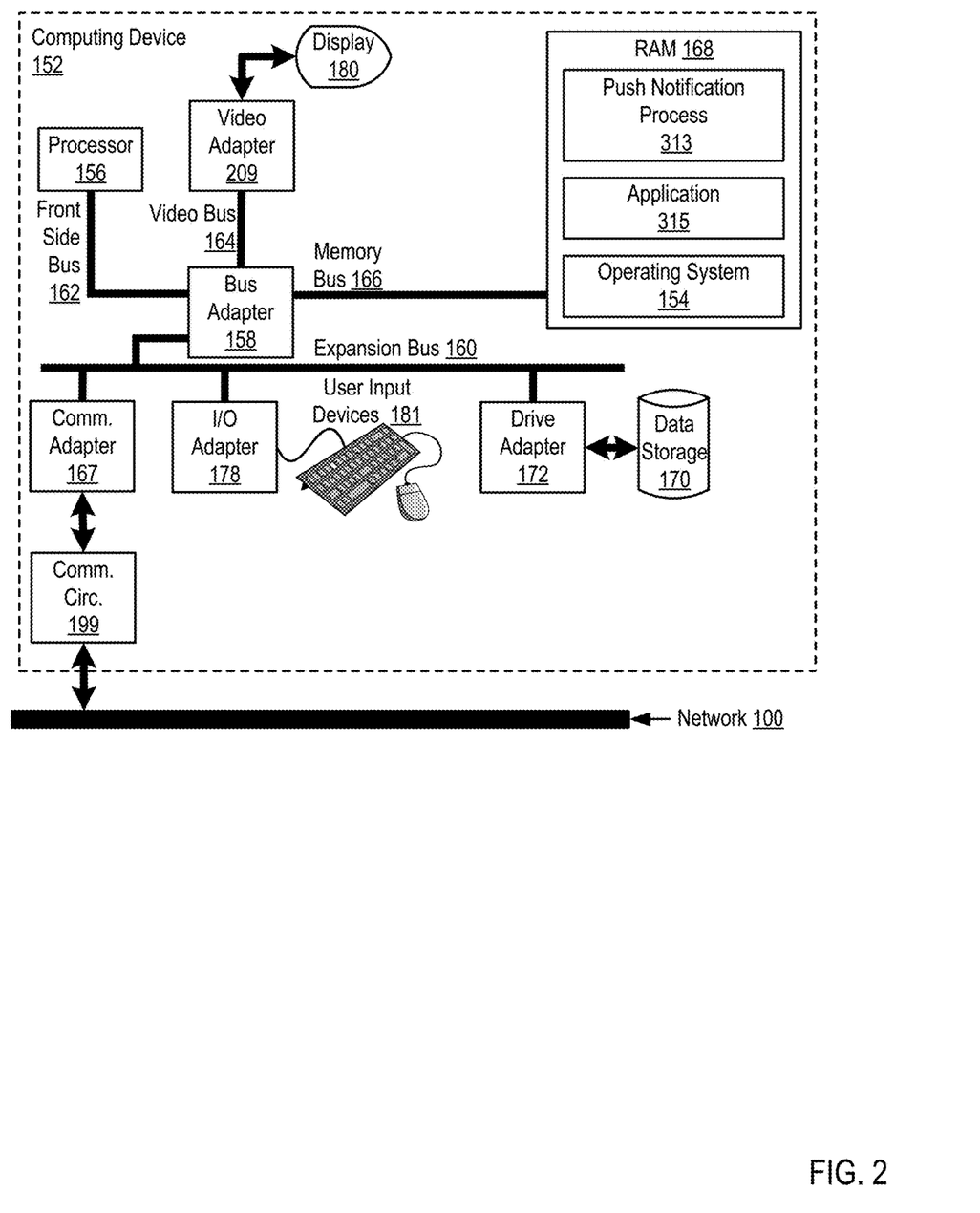
FIG. 2 is a block diagram illustrating an exemplary computer according to embodiments of the present invention.

The computer (152) of FIG. 2 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers configured for fast resumption of dormant sessions on a client device according to embodiments of the present invention include Integrated Drive Electronics ('IDE') adapters, Small Computer System Interface (SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 2 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 2 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 2 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for fast resumption of dormant sessions on a client device according to embodiments of the present invention include modems for wired dial-up communications, Ethernet (IEEE 802.3) adapters for wired data communications, and 802.11 adapters for wireless data communications. The exemplary computer (152) of FIG. 2 also includes communications circuitry (199), such as an antenna and wireless transceiver, for the physical transmission of data over a wireless network.

Figure 3:
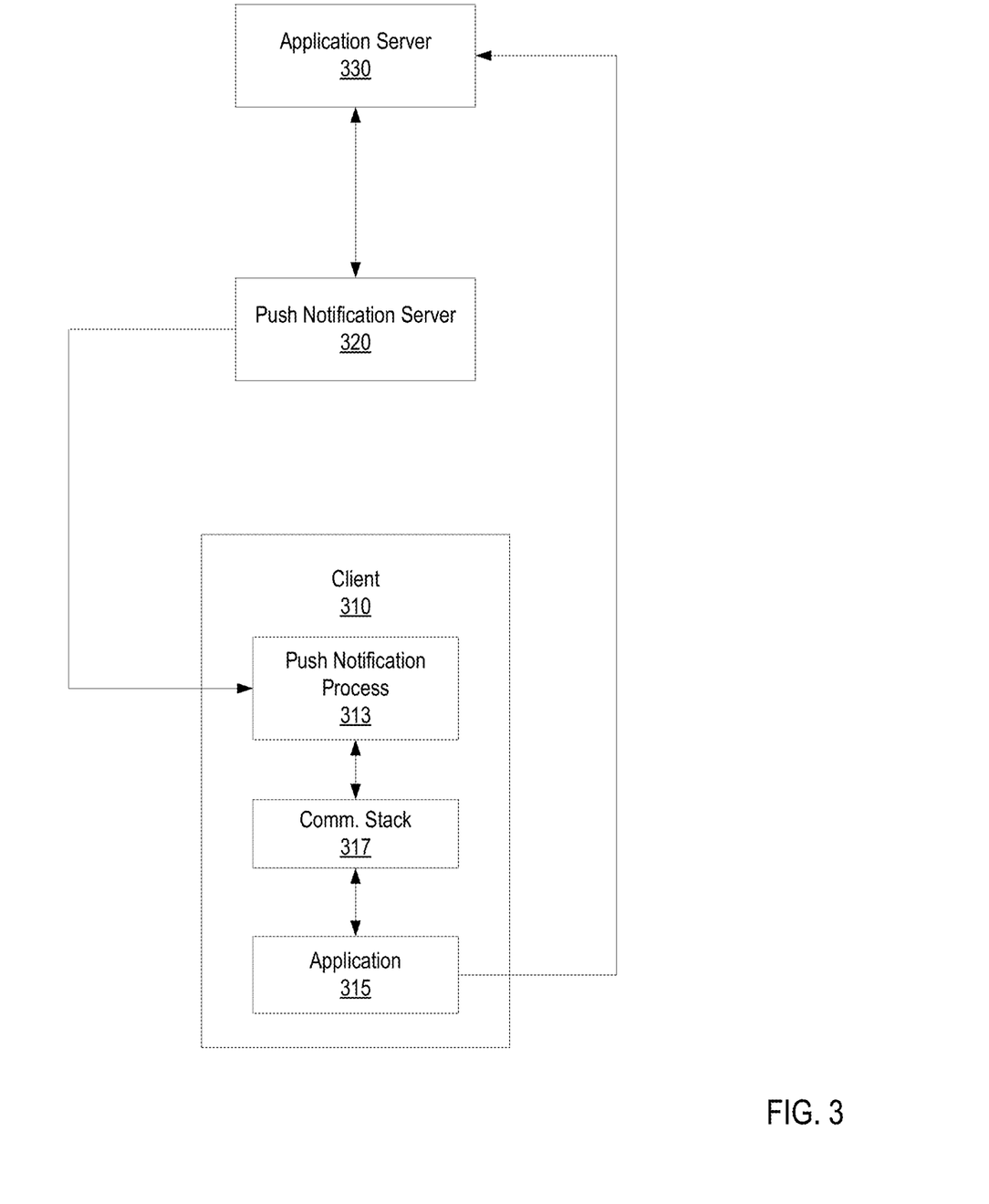
FIG. 3 is a block diagram illustrating an exemplary system according to embodiments of the present invention.

For further explanation, FIG. 3 sets forth a diagram illustrating an exemplary system for fast resumption of dormant sessions on a client device according to embodiments of the present invention that includes a client device (310) including one or more applications (315), a notification platform server (320) that communicates push notifications to the client device (310), and an application server (330) that provides data to the application (315). In one embodiment, the application (315) is a time-sensitive application and the application server (330) is a time-sensitive application server, and the notification platform server (320) is a proxy server that accepts push notification initiation requests and sends push notification messages to client devices such as the client device (310). The client device (310) maintains a link with the push notification server (320) via a connection-oriented reliable transmission protocol, while the client device (310) and the application server (330) communicate via a connectionless protocol (e.g., UDP). In one embodiment, the client device (310) may be a resource-constrained device (e.g., a portable device, smartphone, or Internet-of-Things (IoT) device) in that applications and processes on the device (310) may be placed in a dormant state to conserve battery charge, processor and memory resources, communication bandwidth, and so on.

In the system (300) of FIG. 3, the application server (330) may attempt communication with the application (315) while the application (315) is in a dormant state, for example, to conserve battery charge or processing resources. In the initial attempt, the application server (330) attempts communication via a socket of the device (310). For example, the initiation transmission may be a datagram packet. This initial transmission times out at the application protocol layer because the dormant application (315) will not be able to respond. In response to the communication failure with the application (315), the application server (315) the server tunnels the datagram packet in a push notification request by, for example, embedding the datagram packet in a push notification request as payload and sending the push notification request to the push notification server (320) using a unique identifier of the application (315). For example, the application server (330) may implement session initiation protocol (SIP) for push notification requests, where the target application (315) is a Voice over IP (VoIP) application. Thus, SIP packets are generated by the application server (330) and may be encapsulated (as payload) in the push notification request and the push notification request to the push notification server (320).

In the system (300) of FIG. 3, the push notification server (320) may be a cloud server such as, for example, a push notification server of a cellular communications network provider or wireless access provider that provides network service to the client device (310). The push notification server (320) receives the push notification request encapsulating the datagram packet from the application server (330) and transmits a push notification to the client device (310) with the datagram packet as a push notification payload.

In the system (300) of FIG. 3, the device (310) may be similarly configured as the computer (152) and includes computer-readable instructions that cause the client device to receive a push notification from a push notification server, extract, by a notification process (313) on the client device (310), a datagram packet from the push notification, inject, by the notification process (313), the datagram packet into a communication stack for at least one application (315) on the client device (310), and read, by the at least one application (315), the datagram packet. The push notification process (313) may be a local process, such as a system management process, that is configured to receive push notifications, application wake, or keep-alive messages via a connection-oriented reliable transmission protocol (e.g., TCP, TLS, etc.) from the notification platform server (320). The push notification process (313) may be a standalone process or part of the operating system (154) of the client device (310). The push notification process (313) receives the push notification with the push notification payload encapsulating the datagram packet, parses the push notification payload to extract the datagram packet, and injects the datagram packet into the communication stack (317) using the unique identifier of the application (315). The push notification process (313) also performs platform-specific tasks that schedule the application (315) to exit the dormant state and read the packet from the communication stack (317). In this manner, the application (315), upon awakening, receives the datagram packet that was transmitted by the application server (330) without first reestablishing a session with the application server (330).

Figure 4:
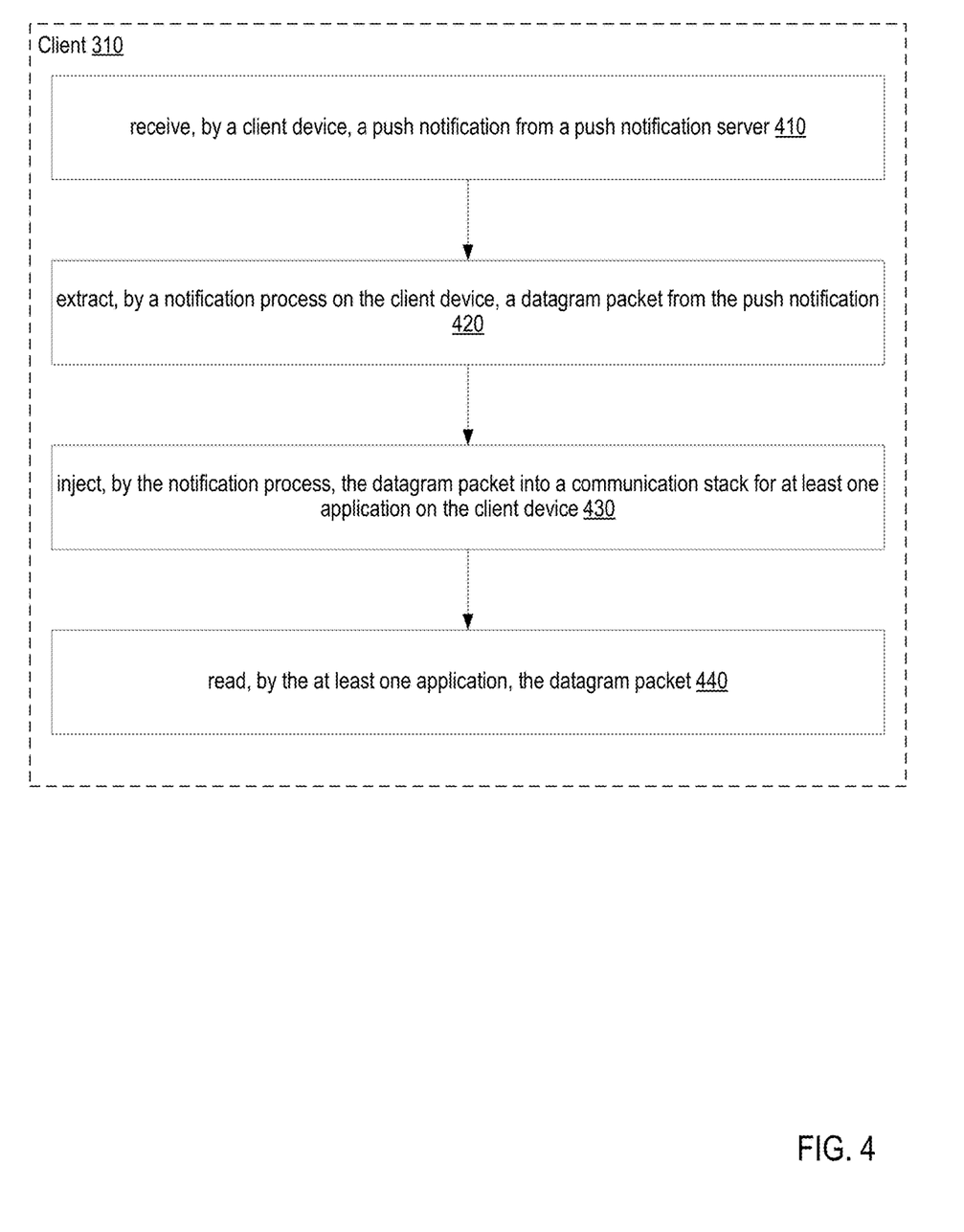
FIG. 4 is a flow chart illustrating an exemplary method according to embodiments of the present invention.

For further explanation, FIG. 4 sets forth a flow chart illustrating an exemplary method for fast resumption of dormant sessions on a client device according to embodiments of the present invention that includes receiving (410), by a client device, a push notification from a push notification server. Receiving (410), by the client device, the push notification from the push notification server may be carried out by the client device (310) receiving a push notification from the push notification server (320) via a connection-oriented reliable transmission protocol (e.g., TCP, TLS, etc.) over the network (100). When the application server (330) sends the push notification request to the push notification server (320), the application server (330) tunnels a datagram packet in the push notification request message by encapsulating the datagram packet as a payload of the push notification request. The push notification request is sent using the unique identifier of the application (315) from the application server (330) to the push notification server (320). The client device (310) maintains a link with the push notification server via the connection-oriented reliable transmission protocol. The push notification server (320) relays the push notification request, including the datagram packet as the notification payload, to the client device (310). For example, the push notification may be received over the network (100) via communications circuitry (199) and communications adapter (167).

The method of FIG. 4 also includes extracting (420), by a notification process on the client device, a datagram packet from the push notification. Extracting (420), by the notification process on the client device, the datagram packet from the push notification may be carried out by the push notification process (313) of the client device (310) parsing the push notification message received from the push notification server (320), and discovering the datagram packet in the payload of the push notification message. The push notification process (313), which is a process local to the client device (310), will recognize the datagram packet in the push notification message payload as a packet intended for the application (315) by, for example, the unique identifier of the application (315).

The method of FIG. 4 also includes injecting (430), by the notification process, the datagram packet into a communication stack for at least one application on the client device. Injecting (430), by the notification process, the datagram packet into a communication stack for at least one application on the client device may be carried out by the push notification process (313) injecting the extracted datagram packet into the communications protocol stack (317). For example, the datagram packet may be a UDP packet that is injected in the communication protocol stack at the transport layer without awareness by the application (315). Accordingly, the application does not need to implement push notification and connection resume logic to receive the datagram packet transmitted by the application server (330) while the application (315) is in a dormant state.

The method of FIG. 4 also includes reading (440), by the at least one application, the datagram packet. Reading (440), by the at least one application, the datagram packet may be carried out by the application (315) hosted on the client device (310) leaving the dormant state and processing the datagram packet transmitted by the server (330). For example, the application (315) awakens and reads the datagram packet from a queue.

Figure 5:
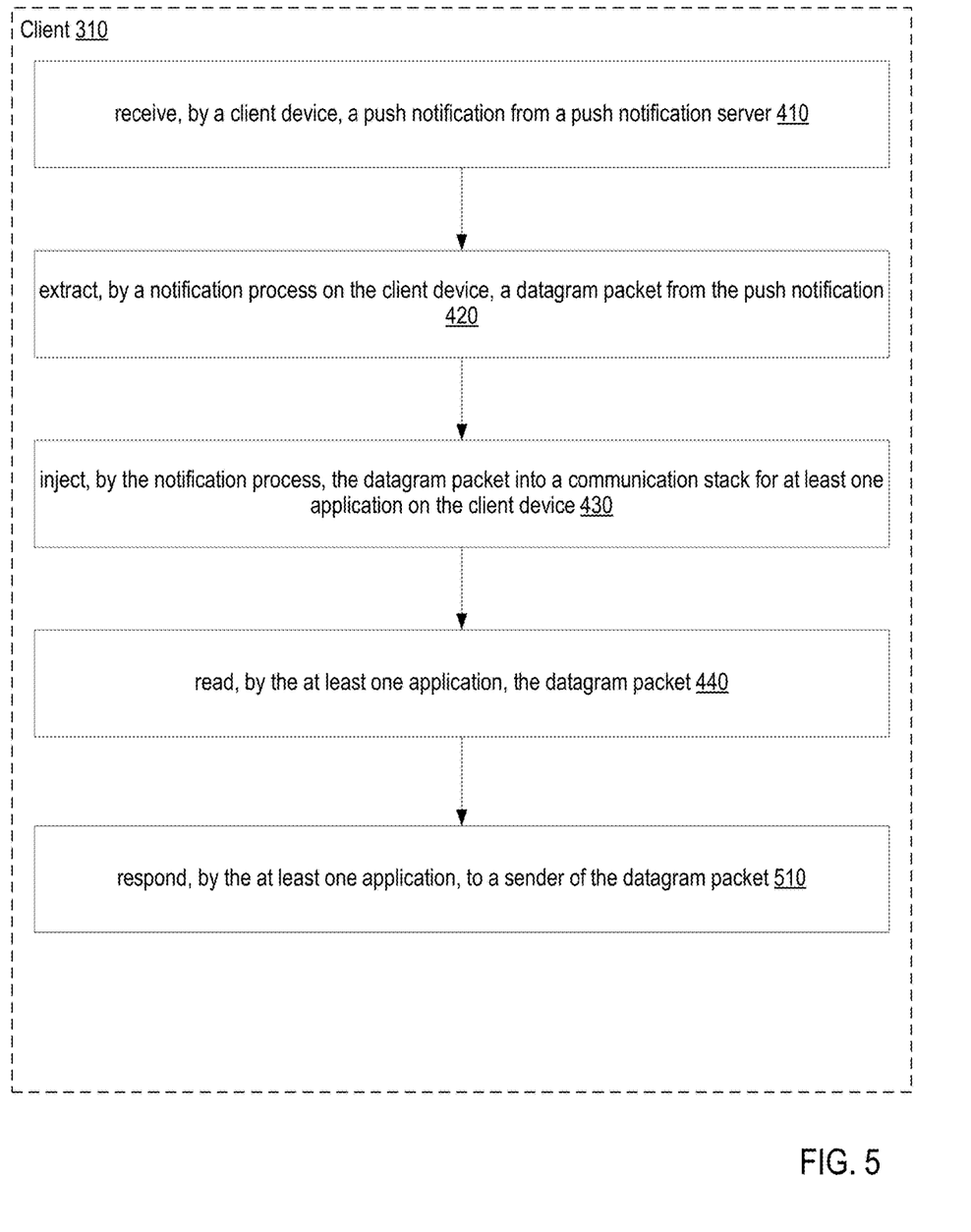
FIG. 5 is a flow chart illustrating another exemplary method according to embodiments of the present invention.

For further explanation, FIG. 5 sets forth a flow chart illustrating a further exemplary method for fast resumption of dormant sessions on a client device according to embodiments of the present invention. The method of FIG. 5 is like the method of FIG. 4 in that the method of FIG. 5 also includes receiving (410), by the client device, the push notification from the push notification server, extracting (420), by the notification process on the client device, the datagram packet from the push notification, injecting (430), by the notification process, the datagram packet into a communication stack for at least one application on the client device, and reading (440), by the at least one application, the datagram packet.

The method of FIG. 5 is different from the method of FIG. 4 in that the method of FIG. 5 further includes responding (510), by the at least one application, to a sender of the datagram packet. Responding (510), by the at least one application, to a sender of the datagram packet may be carried out by the application (315) immediately, upon reading the datagram packet extracted from the push notification, sending a response to the sender of the datagram packet. That is, the application (315) does not need to first send a connection resume packet(s) to the sender of the datagram packet to receive the datagram packet. Instead, the application (315) immediately responds to the datagram packet received as the payload of the push notification message from the notification server (320) without receiving a packet directly from the application server (330). For example, the response may be transmitted over the network (100) via communications circuitry (199) and communications adapter (167).

Figure 6:
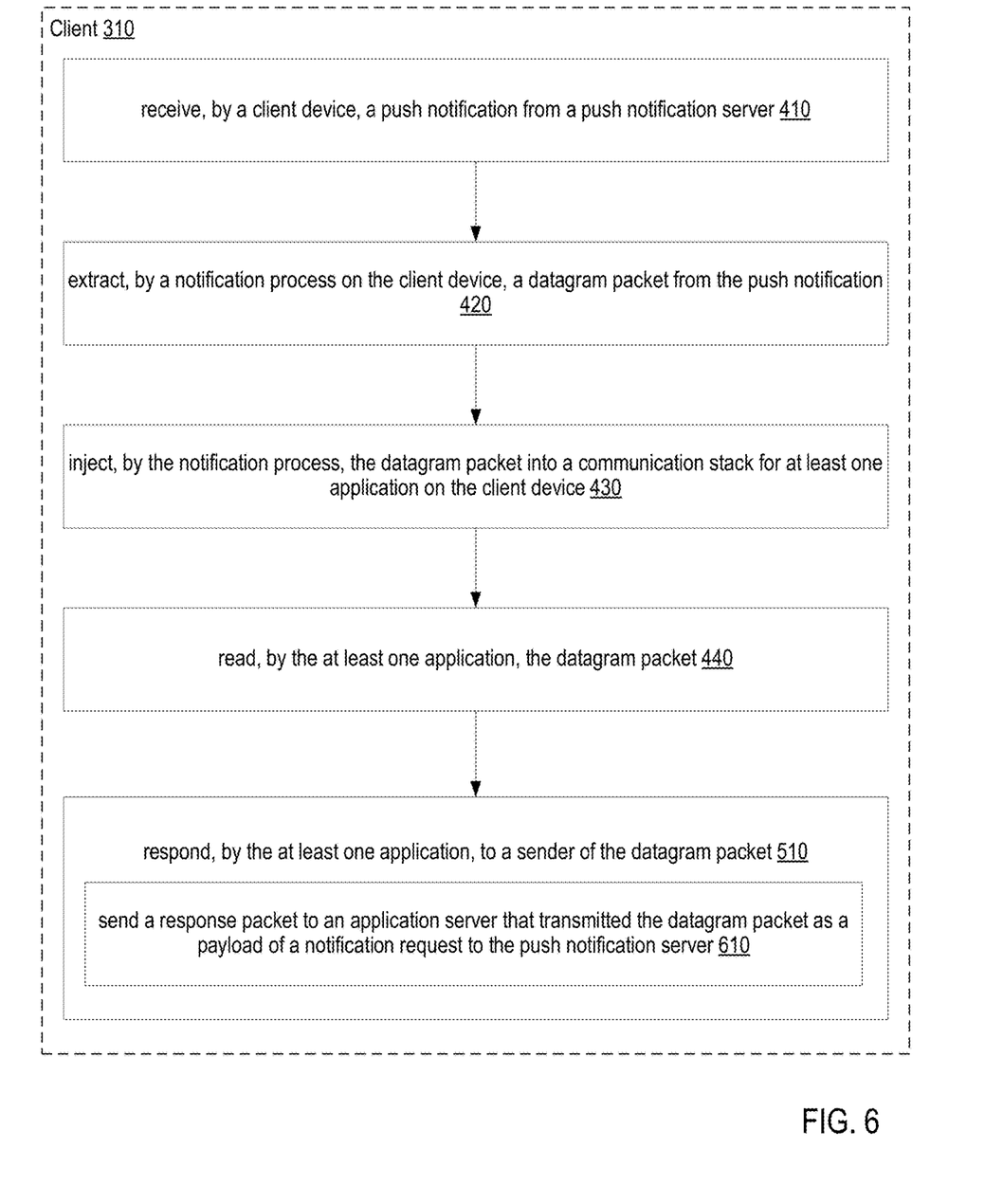
FIG. 6 is a flow chart illustrating another exemplary method according to embodiments of the present invention.

For further explanation, FIG. 6 sets forth a flow chart illustrating a further exemplary method for fast resumption of dormant sessions on a client device according to embodiments of the present invention. The method of FIG. 6 is like the method of FIG. 5 in that the method of FIG. 6 also includes receiving (410), by the client device, the push notification from the push notification server, extracting (420), by the notification process on the client device, the datagram packet from the push notification, injecting (430), by the notification process, the datagram packet into a communication stack for at least one application on the client device, reading (440), by the at least one application, the datagram packet, and responding (510), by the at least one application, to a sender of the datagram packet.

The method of FIG. 6 is different from the method of FIG. 5 in that responding (510), by the at least one application, to a sender of the datagram packet includes sending (610) a response packet to an application server that transmitted the datagram packet as a payload of a notification request to the push notification server. Sending (610) a response packet to an application server that transmitted the datagram packet as a payload of a notification request to the push notification server may be carried out by the application (315) immediately, upon reading the datagram packet, sending a response to the application server (330). That is, the application (315) does not need to first send connection resume packet(s) to the application server (330) to receive the datagram packet. Instead, the application (315) immediately responds to the datagram packet received as the payload of the push notification message from the notification server (320). The application (315) responds to the datagram packet sent by the application server (330) via the push notification without implementing a connection resume procedure. Accordingly, a connection between the application server (330) and the application (315) is automatically resumed by transmitting the datagram packet from the application server (330) as part of the push notification payload. The response packet sent by the application (315) to the application server (330) in response to the initial datagram packet may also be a datagram packet that is transmitted to the application server (330) via UDP. For example, the response packet may be sent over the network (100) via communications circuitry (199) and communications adapter (167).

Figure 7:
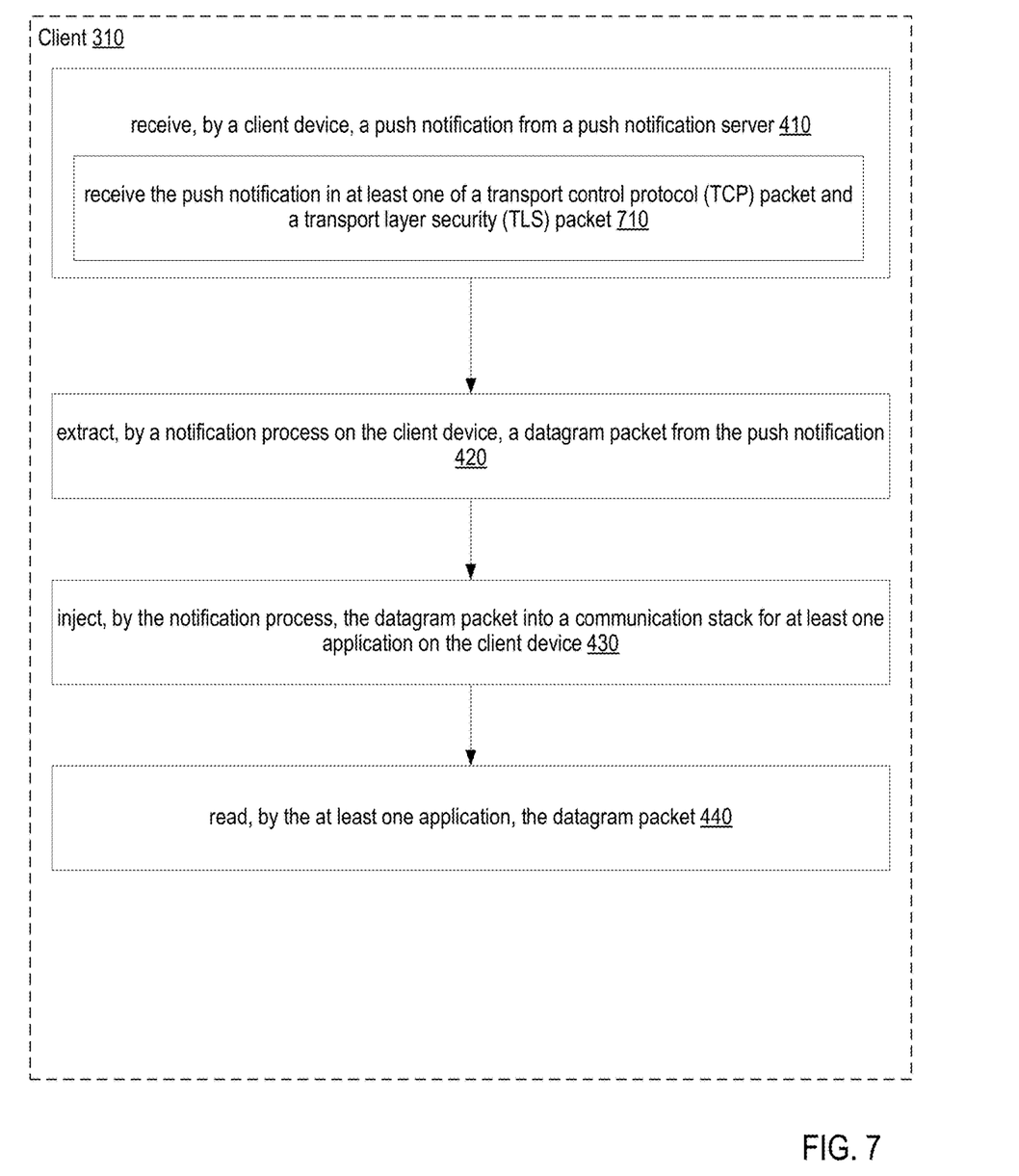
FIG. 7 is a flow chart illustrating another exemplary method according to embodiments of the present invention.

For further explanation, FIG. 7 sets forth a flow chart illustrating a further exemplary method for fast resumption of dormant sessions on a client device according to embodiments of the present invention. The method of FIG. 7 is like the method of FIG. 4 in that the method of FIG. 7 also includes receiving (410), by the client device, the push notification from the push notification server, extracting (420), by the notification process on the client device, the datagram packet from the push notification, injecting (430), by the notification process, the datagram packet into a communication stack for at least one application on the client device, and reading (440), by the at least one application, the datagram packet.

The method of FIG. 7 is different from the method of FIG. 4 in that receiving (410), by a client device, a push notification from the push notification server includes receiving (710) the push notification in at least one of a transport control protocol (TCP) packet and a transport layer security (TLS) packet. Receiving (710) the push notification in at least one of a transport control protocol (TCP) packet and a transport layer security (TLS) packet may be carried out by the client device (315) maintaining a continuous link via TCP or TLS with the push notification server (320) and the push notification process (313) local to the client device (310) receiving the push notification as packet conforming to the connection-oriented reliable transmission protocol. For example, the push notification may be received over the network (100) via communications circuitry (199) and communications adapter (167).

Figure 8:
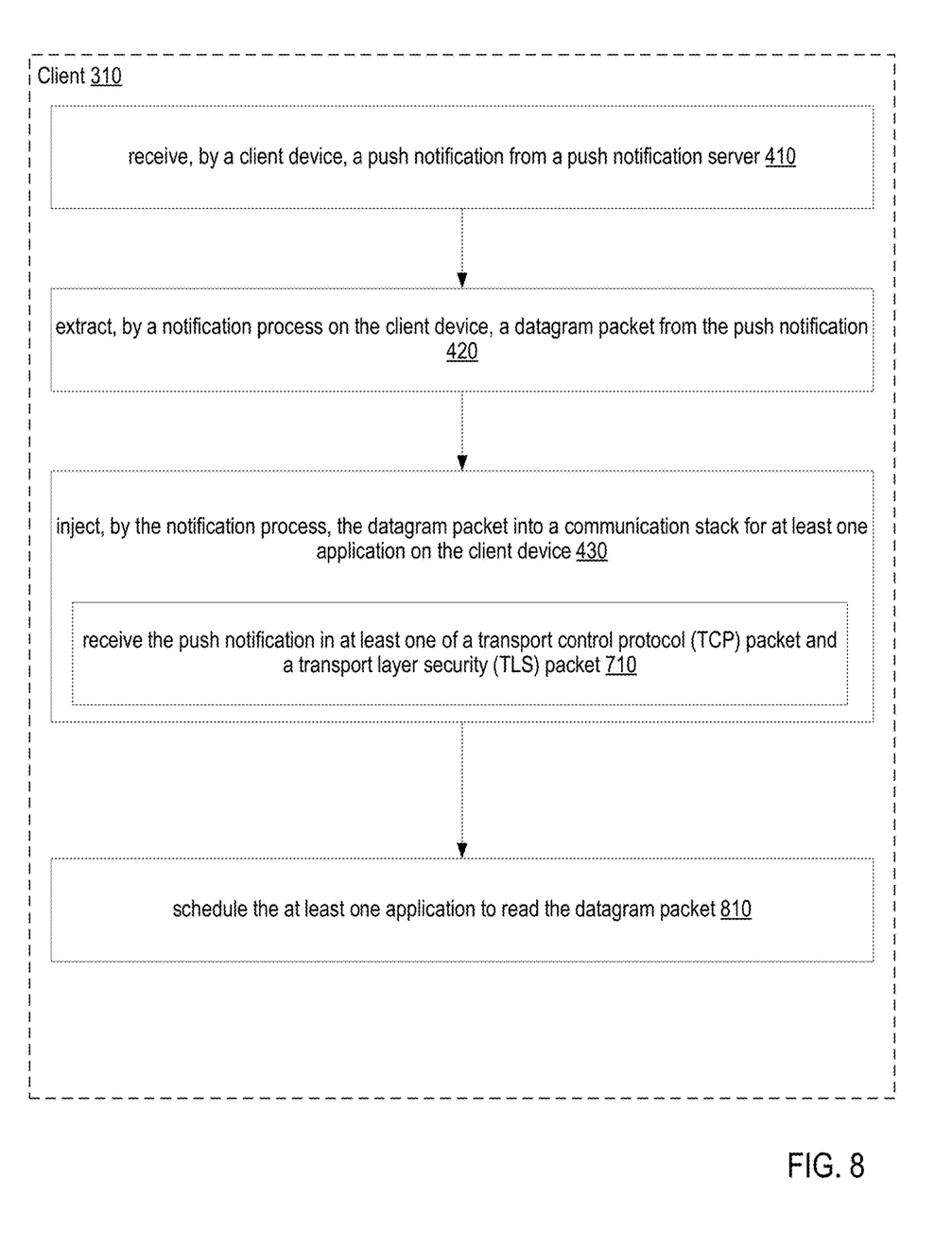
FIG. 8 is a flow chart illustrating another exemplary method according to embodiments of the present invention.

For further explanation, FIG. 8 sets forth a flow chart illustrating a further exemplary method for fast resumption of dormant sessions on a client device according to embodiments of the present invention. The method of FIG. 7 is like the method of FIG. 4 in that the method of FIG. 8 also includes receiving (410), by the client device, the push notification from the push notification server, extracting (420), by the notification process on the client device, the datagram packet from the push notification, injecting (430), by the notification process, the datagram packet into a communication stack for at least one application on the client device, and reading (440), by the at least one application, the datagram packet.

The method of FIG. 8 is different from the method of FIG. 4 in that injecting (430), by the notification process, the datagram packet into the communication stack for at least one application on the client device includes scheduling (810) the at least one application to read the datagram packet. Scheduling (810) the at least one application to read the datagram packet may be carried out by the notification process (313) or operating system (154) of the client device (310) performing tasks to schedule the application (315) to read the datagram packet that has been injected into the communication protocol stack (317). For example, such tasks include removing the application from the dormant state, restoring the application state of the application (315), and instructing the application (315) to read the datagram packet.

Figure 9:
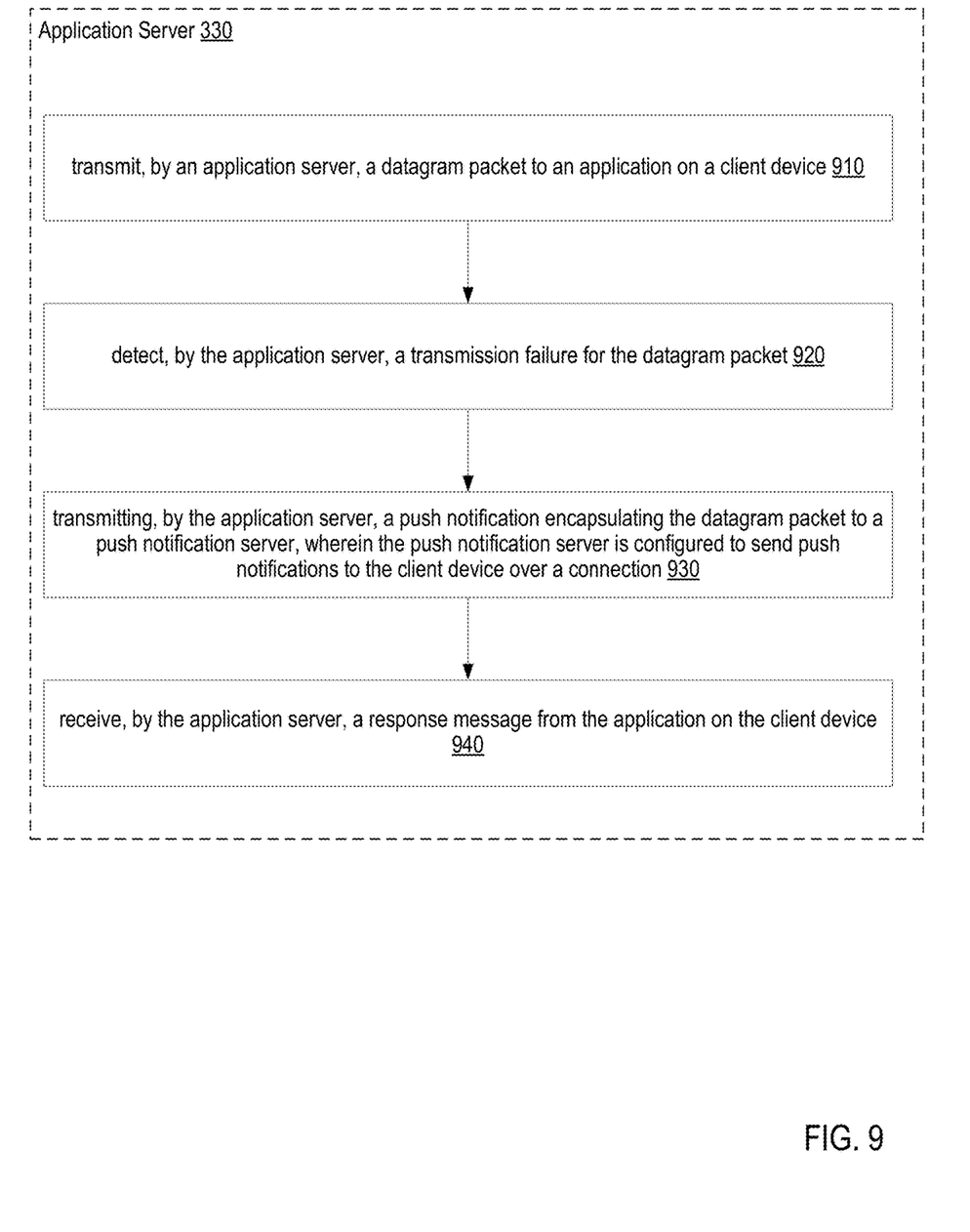
FIG. 9 is a flow chart illustrating another exemplary method according to embodiments of the present invention

For further explanation, FIG. 9 sets forth a flow chart illustrating a further exemplary method for fast resumption of dormant sessions on a client device according to embodiments of the present invention that includes transmitting (910), by an application server, a datagram packet to an application on a client device. Transmitting (910), by an application server, a datagram packet to an application on a client device may be carried out by the application server (330) transmitting a datagram packet in furtherance of providing application service to the application (315) on the client device (310). The application server (330) may attempt communication with the application (315) using a prior-used data path of communication (e.g., a socket for the client application). The application (315) may be a time-sensitive application and the application server (330) may provide time-sensitive application service to the application (315) using a connectionless protocol such as UDP. The client device (310) may be a resource-constrained device, such that the OS of the client device (310) may place the application (315) into a dormant state to conserve processing resources, memory resources, bandwidth, and battery charge. The application (315) on the client device (310) may be transitioned from the dormant state by push notification received in response to a push notification process (313) on the client device (310).

The method of FIG. 9 also includes detecting (920), by the application server, a transmission failure for the datagram packet. Detecting (920), by the application server, a transmission failure for the datagram packet may be carried out by the application server (330) determining that the datagram packet transmission has timed out. For example, when the application server (330) sends the datagram packet to the application (315) using a previous data path (e.g., a UPD socket) while the application (315) is in a sleep state, the transmission times-out at the application protocol layer because the operating system blocks the transmission and/or the dormant application (315) is not be able to respond.

The method of FIG. 9 also includes transmitting (930), by the application server, a push notification request encapsulating the datagram packet to a push notification server, wherein the push notification server is configured to send push notifications to the client device over a connection. Transmitting (930), by the application server, the push notification request encapsulating the datagram packet to the push notification server, wherein the push notification server is configured to send push notifications to the client device over a connection, may be carried out by the application server (330) embedding the datagram packet in the payload of a push notification request and transmitting the push notification request to the push notification server (320). The push notification server (320) is configured to maintain a continuous link with the client device (310) via a connection-oriented protocol such as a TCP or TLS. The push notification sent by the application server (330) for the client device (310) is relayed by the push notification server. The push notification server (320) may be a cloud platform server that provides cloud services to the client device (310).

The method of FIG. 9 also includes receiving (940), by the application server, a response message from the application on the client device. Receiving (940), by the application server, the response message from the application on the client device may be carried out by the application server (330) receiving one or more response packets from the application (315) on the client device (310) in reply to the datagram packet encapsulated in the push notification. The response packet may also be a datagram packet that is transmitted using a connectionless protocol such as UDP.

In view of the explanations set forth above, readers will recognize that the benefits of fast resumption of dormant sessions on a client device according to embodiments of the present invention include:
- a reduction in communication latency, allowing critical time sensitive applications (e.g. chat, messaging, or stock trading applications) to rapidly react to an event;
- conservation of processing resources in that the device saves resources in terms of CPU cycles because it does not have to resume the connection by sending additional packets, which may positively impact the energy consumption in a scenario where the asynchronous events are delivered to the device with high frequency; and
- legacy applications can be easily ported to an energy efficient operating system, because the packet injection mechanism is executed transparently for the application process; otherwise, an application must implement push notification and connection resume logic.

Exemplary embodiments of the present invention are described largely in the context of a fully functional computer system for fast resumption of dormant sessions on a client device. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of fast resumption of dormant sessions on a client device, the method comprising:
   receiving, by the client device, a push notification from a push notification server;
   extracting, by a notification process on the client device, a datagram packet from the push notification;
   injecting, by the notification process, the datagram packet into a communication stack for at least one application on the client device, wherein the datagram packet is injected into the communication stack transparent to the at least one application and while the at least one application is in a dormant state, wherein injecting, by the notification process, the datagram packet into the communication stack for the at least one application on the client device includes scheduling the at least one application to exit the dormant state and then read the datagram packet; and
   reading, by the at least one application, the datagram packet.

2. The method of claim 1, further comprising responding, by the at least one application, to a sender of the datagram packet.

3. The method of claim 2, wherein responding, by the at least one application, to a sender of the datagram packet includes sending a response packet to an application server that transmitted the datagram packet as a payload of a notification request to the push notification server.

4. The method of claim 3, wherein the push notification includes the payload from the notification request transmitted to the push notification server.

5. The method of claim 1, wherein receiving, by the client device, the push notification from the push notification server includes receiving the push notification in a packet, wherein the packet is one of a transport control protocol (TCP) packet and/or a transport layer security (TLS) packet.

6. The method of claim 1, wherein the client device is a resource-constrained device and the at least one application is time-sensitive application.

7. The method of claim 1, wherein the datagram packet is injected into the communication stack at the transport layer.

8. An apparatus for fast resumption of dormant sessions on a client device, the apparatus comprising a computer processor, a computer memory operatively coupled to the computer processor, the computer memory having disposed within it computer program instructions that, when executed by the computer processor, cause the apparatus to carry out the steps of:
   receiving, by the client device, a push notification from a push notification server;
   extracting, by a notification process on the client device, a datagram packet from the push notification;
   injecting, by the notification process, the datagram packet into a communication stack for at least one application on the client device, wherein the datagram packet is injected into the communication stack transparent to the at least one application and while the at least one application is in a dormant state, wherein injecting, by the notification process, the datagram packet into the communication stack for the at least one application on the client device includes scheduling the at least one application to exit the dormant state and then read the datagram packet; and
   reading, by the at least one application, the datagram packet.

9. The apparatus of claim 8, further comprising responding, by the at least one application, to a sender of the datagram packet.

10. The apparatus of claim 9, wherein responding, by the at least one application, to a sender of the datagram packet includes sending a response packet to an application server that transmitted the datagram packet as a payload of a notification request to the push notification server.

11. The apparatus of claim 10, wherein the push notification includes the payload from the notification request transmitted to the push notification server.

12. The apparatus of claim 8, wherein receiving, by the client device, the push notification from the push notification server includes receiving the push notification in at least one of a transport control protocol (TCP) packet or a transport layer security (TLS) packet.

13. A computer program product for fast resumption of dormant sessions on a client device, the computer program product disposed upon a non-volatile computer readable storage medium, the computer program product comprising computer program instructions that, when executed, cause a computer to carry out the steps of:
receiving, by the client device, a push notification from a push notification server;
extracting, by a notification process on the client device, a datagram packet from the push notification;
injecting, by the notification process, the datagram packet into a communication stack for at least one application on the client device, wherein the datagram packet is injected into the communication stack transparent to the at least one application and while the at least one application is in a dormant state, wherein injecting, by the notification process, the datagram packet into the communication stack for the at least one application on the client device includes scheduling the at least one application to exit the dormant state and then read the datagram packet; and
reading, by the at least one application, the datagram packet.

14. The computer program product of claim 13, further comprising responding, by the at least one application, to a sender of the datagram packet.

15. The computer program product of claim 14, wherein responding, by the at least one application, to a sender of the datagram packet includes sending a response packet to an application server that transmitted the datagram packet as a payload of a notification request to the push notification server.

16. The computer program product of claim 13, wherein receiving, by the client device, the push notification from the push notification server includes receiving the push notification in at least one of a transport control protocol (TCP) packet or a transport layer security (TLS) packet.

17. The computer program product of claim 13, wherein the client device is a resource-constrained device and the at least one application is time-sensitive application.

\* \* \* \* \*